(12) United States Patent
Miyajima

(10) Patent No.: US 9,591,201 B2
(45) Date of Patent: Mar. 7, 2017

(54) AF CONTROLLER, LENS APPARATUS INCLUDING THE AF CONTROLLER AND IMAGE PICKUP APPARATUS

(71) Applicant: CANON KABUSHIKI KAISHA, Toyko (JP)

(72) Inventor: Shunsuke Miyajima, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 118 days.

(21) Appl. No.: 14/334,333

(22) Filed: Jul. 17, 2014

(65) Prior Publication Data

US 2015/0022710 A1 Jan. 22, 2015

(30) Foreign Application Priority Data

Jul. 19, 2013 (JP) .................. 2013-150259

(51) Int. Cl.
- *H04N 5/232* (2006.01)
- *G02B 7/34* (2006.01)
- *G03B 13/36* (2006.01)

(52) U.S. Cl.
CPC ........... *H04N 5/23212* (2013.01); *G02B 7/34* (2013.01); *G03B 13/36* (2013.01)

(58) Field of Classification Search
CPC ................................................ H04N 5/23212
USPC ........................................ 348/349, 350, 362
See application file for complete search history.

(56) References Cited

U.S. PATENT DOCUMENTS

| 8,605,200 B2 | 12/2013 | Asano |
| 8,750,699 B2 | 6/2014 | Kawarada |
| 2008/0158408 A1* | 7/2008 | Asano ............... G03B 13/36 348/348 |
| 2008/0198257 A1 | 8/2008 | Morimoto |
| 2008/0246852 A1 | 10/2008 | Mori |
| 2012/0236185 A1* | 9/2012 | Ishii ................ G02B 7/34 348/246 |
| 2012/0274837 A1 | 11/2012 | Yamasaki |

FOREIGN PATENT DOCUMENTS

| EP | 1909229 A2 | 4/2008 |
| JP | 2008-164832 A | 7/2008 |
| JP | 2012-027367 A | 2/2012 |
| JP | 2012-189934 A | 10/2012 |

OTHER PUBLICATIONS

European Search Report issued in European counterpart application No. EP14002460.5, dated Jul. 30, 2015.

* cited by examiner

*Primary Examiner* — Anthony J Daniels
(74) *Attorney, Agent, or Firm* — Rossi, Kimms & McDowell LLP

(57) ABSTRACT

An AF controller includes: a signal generator configured to generate an image signal pair for each of a plurality of areas in an imaging angle of view; a target position deriver configured to derive a driving target position of a focus lens based on a defocus amount derived by the image signal pair input from the signal generator and based on an acquired position of the focus lens; and a driving command unit configured to output a driving command of the focus lens based on the driving target position, wherein the driving command unit outputs the driving command of the focus lens based on the driving target position in a range of a threshold.

17 Claims, 14 Drawing Sheets

AF CONTROLLER, LENS APPARATUS INCLUDING THE AF CONTROLLER AND IMAGE PICKUP APPARATUS

BACKGROUND OF THE INVENTION

Field of the Invention

The present invention relates to an AF controller used in an optical device, such as a television lens and a video lens, and more particularly, to an AF controller used in an optical device having an auto focus function including a focus state detector of a phase difference detection system, a lens apparatus including the AF controller and an image pickup apparatus.

Description of the Related Art

Conventionally, there is an AF adjustment method of controlling the position of a focus lens to continue automatically focusing an object all the time in video imaging (hereinafter, called "full-time AF"). However, an object not intended by the photographer may be focused in the full-time AF, depending on the imaging conditions. For example, the focal position may be moved to the background during imaging of a main object. To solve the problem, Japanese Patent Application Laid-open Mo. 2008-164832 discloses a technique of setting a limit to the driving range of the focus lens according to the movement of the object and driving the focus lens only in the limited range.

In an imaging node, the focus needs to be switched from a focused object to an object at a position with a different object distance due to a change in the composition. However, the driving lens of the focus lens is limited in the technique disclosed in Japanese Patent Application Laid-open No. 2008-164832, and focusing the object at a different object distance is difficult. More specifically, although the same object can be tracked, handling the change in the object due to the change in the composition is difficult. Therefore, there can be a method of not setting a limit to the driving range in order to focus the object when the object is changed due to the change in the composition. However, although the change in the composition can be handled in the method of not setting a limit to the driving range, an object not intended by the photographer may be focused. Therefore, there is a method of using a plurality of focus detection sensors to select a main object from detection results after waiting for completion of charge accumulation by all of the focus detection sensors. The charge accumulation time of the focus detection sensors varies depending on the luminance of the target object, and it takes more time for a focus detection sensor targeting an object with a low luminance to accumulate the charge compared to other focus detection sensors. More specifically, in the method of waiting for the completion of the charge accumulation by all of the focus detection sensors, the possibility of focusing an object other than the main object can be reduced, and the stability improves. However, much time is required, and the tracking performance is reduced. Therefore, to improve the tracking performance, there can be a method of adopting the detection result of the focus detection sensor that has first completed the charge accumulation, and the charge accumulation of the other focus detection sensors is forcibly terminated. In the method of adopting the focus detection sensor that has first completed the charge accumulation, the change in the composition can be handled, and the tracking performance improves. However, when there is an object with a high luminance in the background, the focal position may be moved to the object with a high luminance in the background.

FIG. 15A (composition 1) illustrates a main object and sensor areas formed by a plurality of focus detection sensors. An inner frame of FIG. 15A (composition 1) indicates an AF frame for setting sensor areas used to detect the focus, and three areas divided by dotted lines in the AF frame indicate sensor areas A, B and C. The main object is focused in FIG. 15A (composition 1). FIG. 15A (composition 2) illustrates a case in which the background includes an object with a higher luminance than the main object after the composition is changed from FIG. 15A (composition 1). FIG. 15B illustrates a timing chart of AF processing in the composition of FIG. 15A (composition 2). In the process of FIG. 15B, a sensor area in which the charge accumulation is first completed is adopted, and the charge accumulation of the other sensor areas is forcibly terminated to improve the tracking performance. At time t0, the charge accumulation of the sensor areas A, B and C is started. At time t1, the charge accumulation of the sensor area A is completed, and the charge accumulation of the sensor areas B and C is forcibly terminated. A defocus amount is derived based on the detection result of the sensor area A in which the charge accumulation is first completed, and a focus lens target position is derived based on the defocus amount. The focus lens is then driven based on the focus lens target position. As a result, an object in the background that is not the main object is focused. In this control method, the processing time is short, and the tracking performance is high. However, an object not intended by the photographer may be focused, and the stability is reduced. If all sensor areas in the AF frame are detected to improve the stability, the tracking performance is reduced.

An object of the present invention is to provide an AF controller that can attain both of AF tracking performance and stability, a lens apparatus including the AF controller and an image pickup apparatus.

SUMMARY OF THE INVENTION

To attain the object, the present invention provides an AF controller including: a signal generator configured to generate an image signal pair for each of a plurality of areas in an imaging angle of view; a target position deriver configured to derive a driving target position of a focus lens based on a defocus amount derived by the image signal pair input from the signal generator and based on an acquired position of the focus lens; and a driving command unit configured to output a driving command of the focus lens based on the driving target position, wherein the driving command unit outputs one driving command of the focus lens based on the driving target position in a range of a threshold.

The present invention can provide an AF controller that can attain both tracking performance and stability in full-time AF, a lens apparatus including the AF controller and an image pickup apparatus. Therefore, the possibility of movement of the focal position to another object can be reduced, while the tracking performance of the main object is maintained. Furthermore, another object can also be focused when the composition is changed.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

First Embodiment

Figure 1:
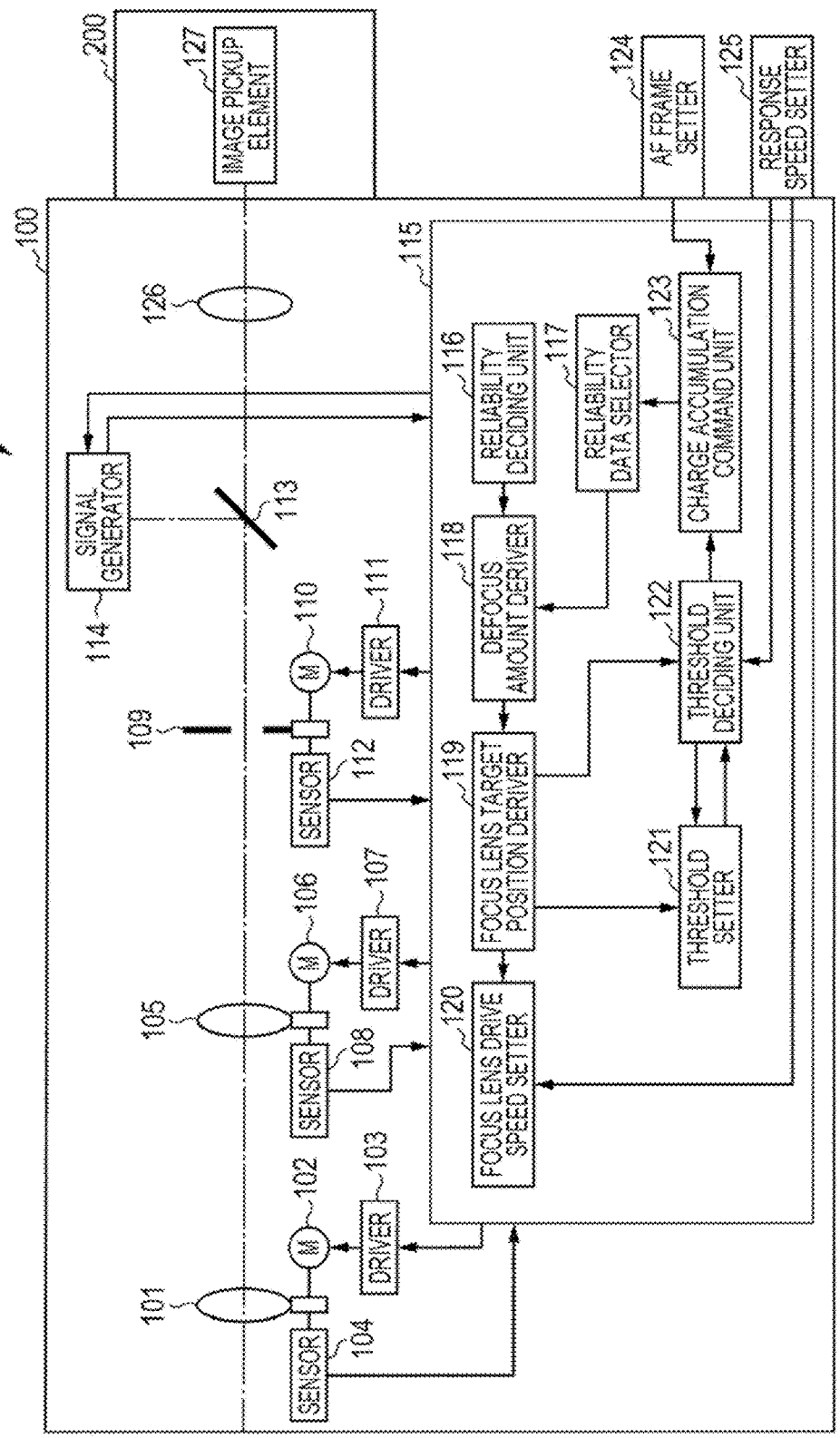
FIG. 1 is a block diagram of an AF controller of a first embodiment.

FIG. 1 illustrates configurations of an AF controller 115 according to the present embodiment, a lens apparatus 100 including the AF controller 115, and an image pickup apparatus 300. In the following description, only main parts of the present invention will be illustrated to facilitate understanding of the present invention, and parts that are not features of the present invention will not be illustrated.

The lens apparatus 100 includes a focus lens 101 which moves in an optical axis direction to change the position of an imaging surface of the lens apparatus 100.

A focus motor 102 is connected to the focus lens 101. The focus motor 102 is driven by a focus driver 103 to move the focus lens 101 in the optical axis direction. The focus motor 102 and the focus driver 103 form a focus lens driving unit. A focus lens position detector (position detector) 104 detects the position of the focus lens 101.

A zoom lens 105 moves in the optical axis direction to change the focal length of the lens apparatus 100. A zoom motor 106 is connected to the zoom lens 105. The zoom motor 106 is driven by a zoom driver 107 to move the zoom lens 105 in the optical axis direction. The zoom motor 106 and the zoom driver 107 constitute a zoom lens driving unit. A zoom lens position detector 108 detects the position of the zoom lens 105.

An iris motor 110 is connected to a variable stop 109. The iris motor 110 is driven by an iris driver 111 to drive the variable stop 109. The iris motor 110 and the iris driver 111 constitute an iris driving unit. An iris position detector 112 detects the position (aperture) of the variable stop 109.

A spectral prism 113 divides light transmitted through the focus lens 101 and the zoom lens 105 into two beams. One of the beams transmitted through the spectral prism 113 passes through a relay lens 126 to enter an image pickup element 127 in a camera apparatus 200 connected to the lens apparatus 100, and the image pickup element 127 receives object light through the lens apparatus 100. The other beam reflected by the spectral prism 113 enters a signal generator 114 of a phase difference detection system. The signal generator 114 includes a phase difference detecting lens and a phase difference detection sensor, and the phase difference sensor photoelectrically converts a pair of images (two images) formed by the two beams divided by the phase difference detecting lens. The phase difference detection sensor is configured to output a pair of image signals for each of a plurality of areas dividing an imaging angle of view.

The lens controller 115 is, for example, a microcomputer and controls the focus lens driving unit, the zoom lens driving unit and the iris driving unit.

A reliability deciding unit 116 decides reliability of a pair of image signals (image signal pair) that are part of the imaged beams photoelectrically converted by the signal generator 114. The reliability of the pair of image signals (image signal pair) indicates a degree of correlation between corresponding images and evaluates whether the images are images of the same object or whether the waveforms are appropriate so that the phase difference can be accurately detected when the images are images of the same object. More specifically, high reliability indicates a state in which it is likely that the pair of image signals is image signals of the same object, and the shapes of the waveforms allow easy and accurate evaluation of the phase difference. Low reliability indicates that it is unlikely that the pair of image signals is image signals of the same object or indicates that the pair of image signals is not appropriate as signals for detecting the focus.

A reliability data selector 117 selects an image signal pair for deriving a defocus amount from one or a plurality of image signal pairs for which the reliability deciding unit 116 has decided that the reliability is high.

A defocus amount deriver 118 calculates a phase difference between a pair of image signals that are information from one of the reliability deciding unit 116 and the reliability data selector 117 and derives a defocus amount relative to a predetermined object.

A focus lens target position deriver (target position deriver) 119 derives a focus lens target position from the defocus amount derived by the defocus amount deriver 118 and position information of the focus lens position detector 104.

A focus lens drive speed setter 120 sets a speed of driving the focus lens 101 based on the focus lens target position derived by the focus lens target position deriver 119 and information from a response speed setter 125.

For the current focal position, a threshold setter (threshold setter) 121 sets a threshold, which indicates a width in the optical axis direction, the threshold serving as an effective range of the amount of difference in the focus lens target position of the next time.

A threshold deciding unit 122 decides whether the focus lens target position derived by the focus lens target position deriver 119 is within the threshold set by the threshold setter 121.

Based on the decision result of the threshold deciding unit 122, a charge accumulation command unit (accumulation command unit) 123 commands the signal generator 114 to continue or terminate the charge accumulation of the sensors in an AF frame set by an AF frame setter 124.

The AF frame setter 124 is, for example, a switch and sets an AF frame for setting the sensor areas to be used for the focus detection in the sensors of the signal generator 114.

The response speed setter 125 is, for example, a volume switch and sets parameters for determining a driving speed of the focus lens 101 and a response speed of AF processing which indicates whether to make a final AF decision after the completion of the charge accumulation of all sensors in the AF frame.

Figure 2:
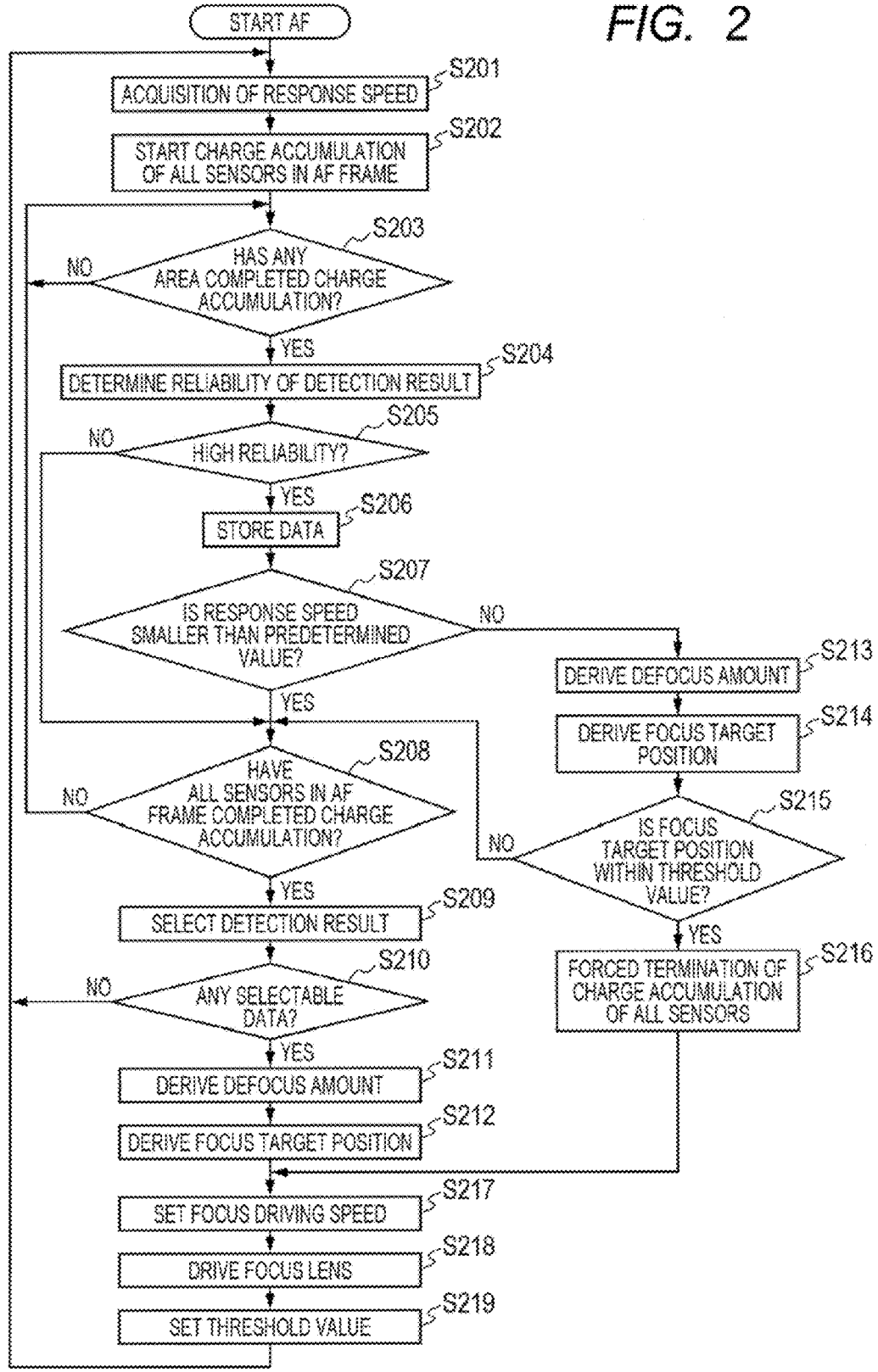
FIG. 2 is a flow chart of the first embodiment.
Figure 3A:
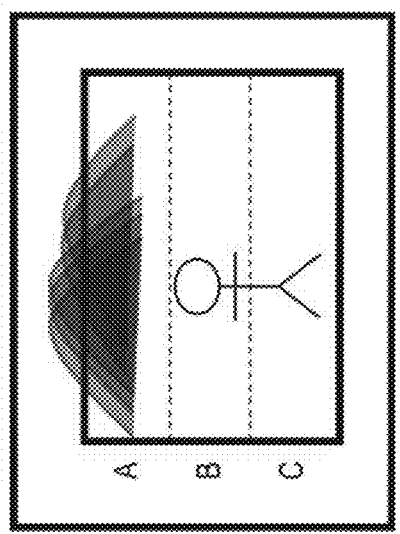
FIG. 3A illustrates a photographed image and sensor areas when the first embodiment is applied.
Figure 3B:
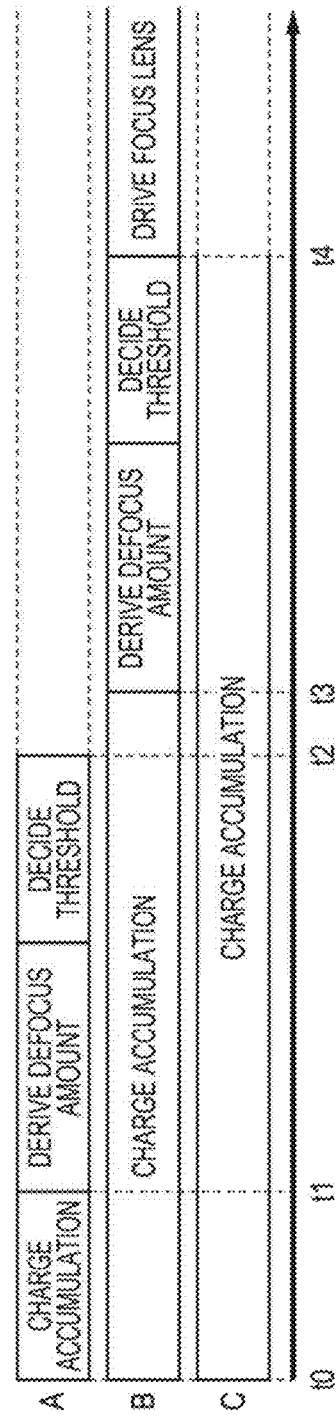
FIG. 3B is a timing chart when the first embodiment is applied.

A flow chart of the first embodiment of FIG. 2, a photographed image and an AF frame of FIG. 3A when the first embodiment is applied, and a timing chart of the first embodiment of FIG. 3B will be used to describe the configuration in detail.

The flow chart of FIG. 2 starts a process when AF is started.

In step S201, the response speed of the AF processing set by the response speed setter 125 is acquired. In step S202, the charge accumulation of all sensors in the AF frame set by the AF frame setter 124 is started. In step S203, whether there is a sensor that has completed the charge accumulation among the sensors that have started the charge accumulation in step S202 is decided. If there is a sensor that has completed the charge accumulation, the process proceeds to step S204. If there is no sensor that has completed the charge accumulation, the process returns to step S203 and waits until one of the sensors completes the charge accumulation.

In step S204, the reliability of the pair of image signals as part of the imaged beams photoelectrically converted by the signal generator 114 is decided. In the deciding method, it is decided that the reliability of a highly correlated pair of image signals is high. Specific processing is not related to the present invention, and details will not be described.

In step S205, whether the reliability of the pair of image signals decided in step S204 is high is decided. If the reliability of the pair of image signals is high, the process proceeds to step S206. On the other hand, if the reliability of the pair of image signals is low, the process proceeds to step S208.

In step S206, the pair of image signals, for which it is decided that the reliability is high in step S205, is stored.

In step S207, whether the response speed acquired in step S201 is smaller than a predetermined value is decided. If the response speed is smaller than the predetermined value (if AF decision does not have to be carried out at a high speed), the process proceeds to step S208. On the other hand, if the response speed is greater than the predetermined value (if AF decision is required to be carried out at a high speed), the process proceeds to step S213.

In step S208, whether the charge accumulation of all sensors in the AF frame set by the AF frame setter 124 (phase difference detection sensors of all areas subject to AF adjustment) is completed is decided. If the charge accumulation of all sensors in the AF frame is completed, the process proceeds to step S209. On the other hand, if the charge accumulation of all sensors in the AF frame is not completed, the process returns to step S203.

In step S209, signals for deriving the defocus amount are selected from one or more image signal pairs with high reliability stored in step S206. For example, signals with the highest reliability among the stored signals or signals with the highest degree of coincidence in the shapes of the waveforms of two images can be selected.

In step S210, whether there is an image signal pair to be selected in step S210 is decided. If there are signals to be selected, the process proceeds to step S211. If there is no signal to be selected, the process returns to step S201.

In step S211, the phase difference between the pair of image signals selected in step S209 is derived to derive the defocus amount. In step S212, the focus lens target position is derived from the defocus amount derived in step S211 and the current focus lens position acquired from the focus lens position detector 104.

In step S213, the phase difference between the pair of image signals, for which it is decided that the reliability is high in step S205, is derived to derive the defocus amount.

In step S214, the focus lens target position is derived from the defocus amount derived in step S213 and the current focus lens position acquired from the focus lens position detector 104.

In step S215, whether the focus lens target position derived in step S214 is within the threshold set by the threshold setter 121 is decided. If the focus lens target position is within the threshold, the process proceeds to step S216. If the focus lens target position is not within the threshold, the process proceeds to step S208.

In step S216, the charge accumulation of all sensors in the AF frame set by the AF frame setter 124 is forcibly terminated.

In step S217, a focus lens driving speed is read from a table (or may be calculated) and set based on the focus lens target position derived in one of steps S212 and S214 and the response speed acquired in step S201.

In step S218, the focus lens is driven at the driving speed set in step S217.

In step S219, a threshold is set for the focus lens target position derived in one of steps S212 and S214, the threshold serving as an effective range of the amount of difference in the focus lens target position of the next time. For example, an object distance of 5 m in the optical axis direction is set for the focus lens target position.

The focus lens target position is derived in the series of flow to drive the focus lens.

FIG. 3A illustrates an object and AF sensors, and FIG. 3B illustrates a timing chart when the first embodiment is applied in the composition of FIG. 3A. FIG. 3A illustrates a composition similar to FIG. 15A (composition 2), and the composition is changed from FIG. 15A (composition 1). The background includes an object with a higher luminance than the main object. The main object is focused at the time of FIG. 15A (composition 1), and the threshold is set based on the position of the main object. At time t0 of FIG. 3B, the charge accumulation of the sensor areas A, B and C is started. At time t1, the charge accumulation of the sensor area A is completed. For the detection result of the sensor area A, the defocus amount is derived to derive the focus lens target position. At time t2, whether the derived focus lens target position is within the threshold is decided. In the case of FIG. 3A, the detection result of the sensor area A indicates the object in the background, and it is decided that the distance between the position and the focal position of the last time is higher than the threshold. Therefore, the charge accumulation of the sensor areas B and C is continued at the time t2. At time t3, the charge accumulation of the sensor area B is completed. For the detection result of the sensor area B, the defocus amount is derived to derive the focus target position. At time t4, whether the derived focus target position is within the threshold is decided. In the case of FIG. 3A, the sensor area B performs the charge accumulation for the main object. Therefore, it is decided that the detection result of the sensor area B is within the threshold, and the charge accumulation of the sensor area C is forcibly terminated at time t4. The focus lens is driven toward the focus lens target position derived from the detection result of the sensor area B. Therefore, in the conventional example, the detection result of the sensor area in which the charge accumulation is first completed is adopted to improve the tracking performance, and an object not intended by the photographer may be focused when there is an object with a high luminance. However, in the present invention, the threshold is set for the focal position of the last time, and the charge accumulation of the other sensor areas is forcibly terminated when the charge accumulation of the sensor area for the object within the threshold is completed. This can attain both of the tracking performance and the stability. To place more emphasis on the stability, the detection result can be selected after waiting for the completion of the charge accumulation of all sensors in the AF frame based on the setting of the response speed setter.

Although the AF frame setter 124 is a switch for the AF frame in the present embodiment, the advantageous effects of the present invention can also be attained when the AF frame setter 124 is cross keys or a joystick. The advantageous effects of the present invention can also be attained by automatically setting the AF frame based on the position of the object.

Although the threshold is set for the focus lens target position in the present embodiment, the arrangement is not limited to this. For example, a prediction value, a defocus amount or an object distance indicating the difference between the peak positions of the pair of image signals can be used in place of the focus lens position to attain the advantageous effects of the present invention.

Although the value of the threshold is 5 m in the optical axis direction in the present embodiment, the advantageous effects of the present invention can also be attained by arbitrarily changing the value. The advantageous effects of the present invention can also be attained by arranging an external input unit (threshold changer), such as a switch, on the lens apparatus 100 or outside of the lens apparatus 100 to allow the user to arbitrarily change the threshold.

Although the focus lens position detector 104, the zoom lens position detector 108 and the iris position detector 112 are included in the present embodiment, the advantageous effects of the present invention can also be attained without these components. For example, stepping motors can be used to figure out the positions of the focus lens 101, the zoom lens 105 and the variable stop 109 based on the number of steps.

Although the spectral prism 113 is used to divide the beam in the present embodiment, the advantageous effects of the present invention can also be attained without the spectral prism 113. For example, a phase difference detecting lens and a phase difference detection sensor are included in an image pickup element.

The same applies to the following embodiments.

Second Embodiment

An AF controller according to a second embodiment will be described.

The most characteristic part of the AF controller of the present embodiment compared to the first embodiment is that the thresholds are set according to the state of the object (static object, moving object, movement direction and speed).

In the following description, only main parts of the present invention will be illustrated to facilitate understanding of the present invention, and parts that are not features of the present invention will not be illustrated.

Figure 4:
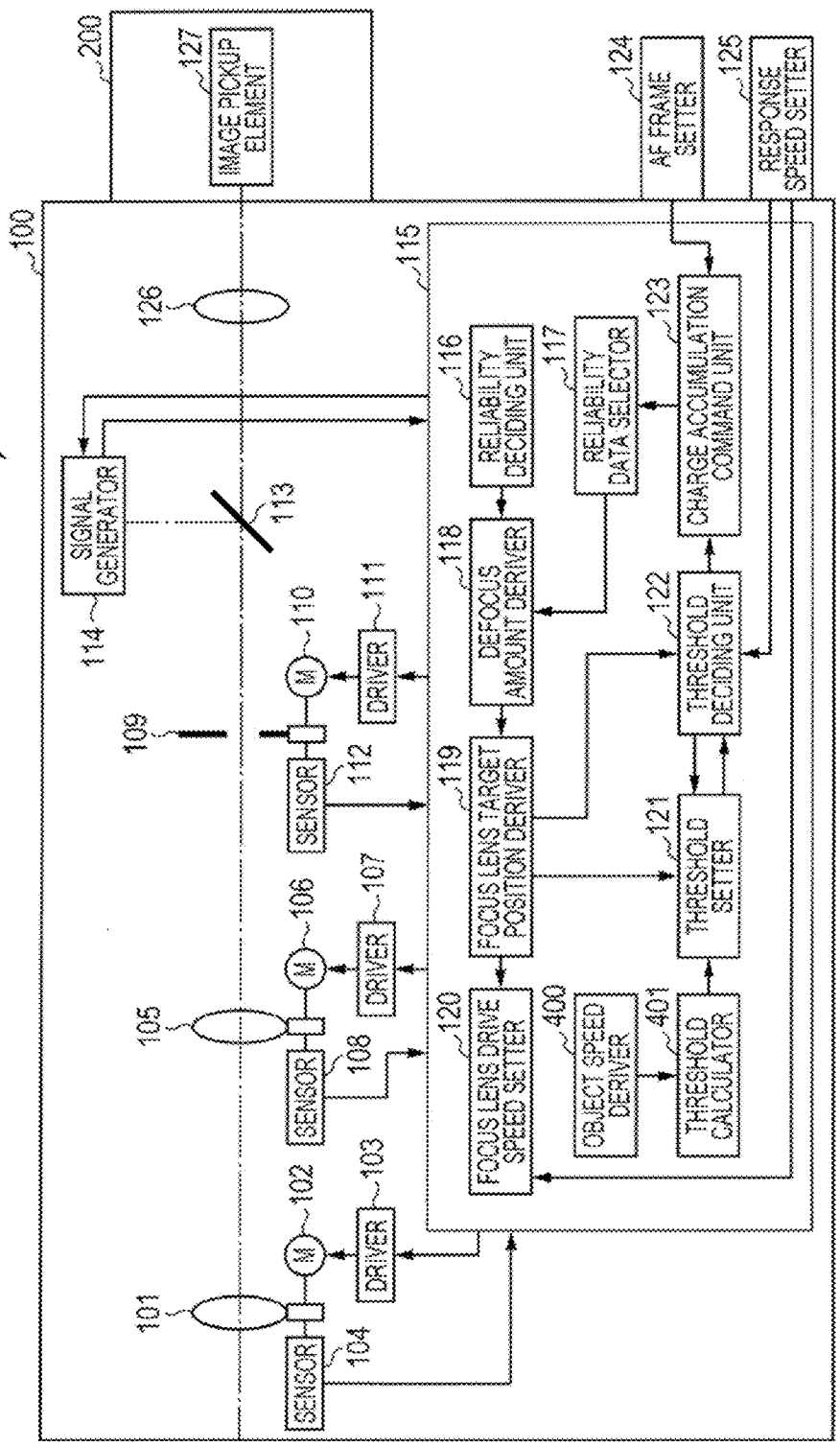
FIG. 4 is a block diagram of a second embodiment.

FIG. 4 illustrates a configuration of the AF controller according to the present embodiment. The same configurations as the first embodiment illustrated in FIG. 1 will not be described, and parts different from the first embodiment will be described.

An object speed deriver 400 derives a movement speed of an object in the optical axis direction based on the time required for the detection of the focus by the signal generator 114 and the information from the focus lens target position deriver 119.

A threshold calculator 401 calculates thresholds based on the object movement speed derived by the object speed deriver 400.

Figure 5:
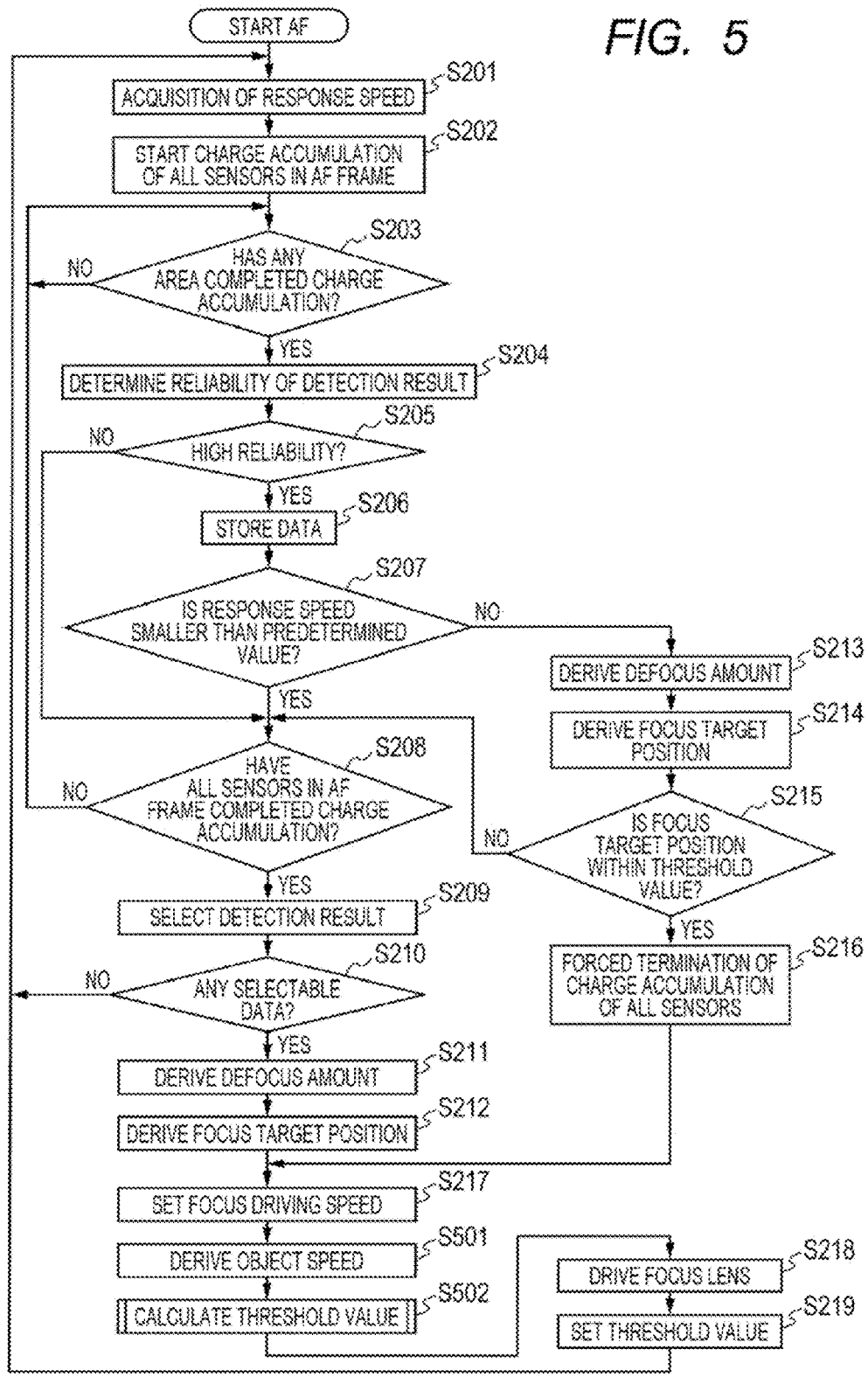
FIG. 5 is a flow chart of the second embodiment.
Figure 6:
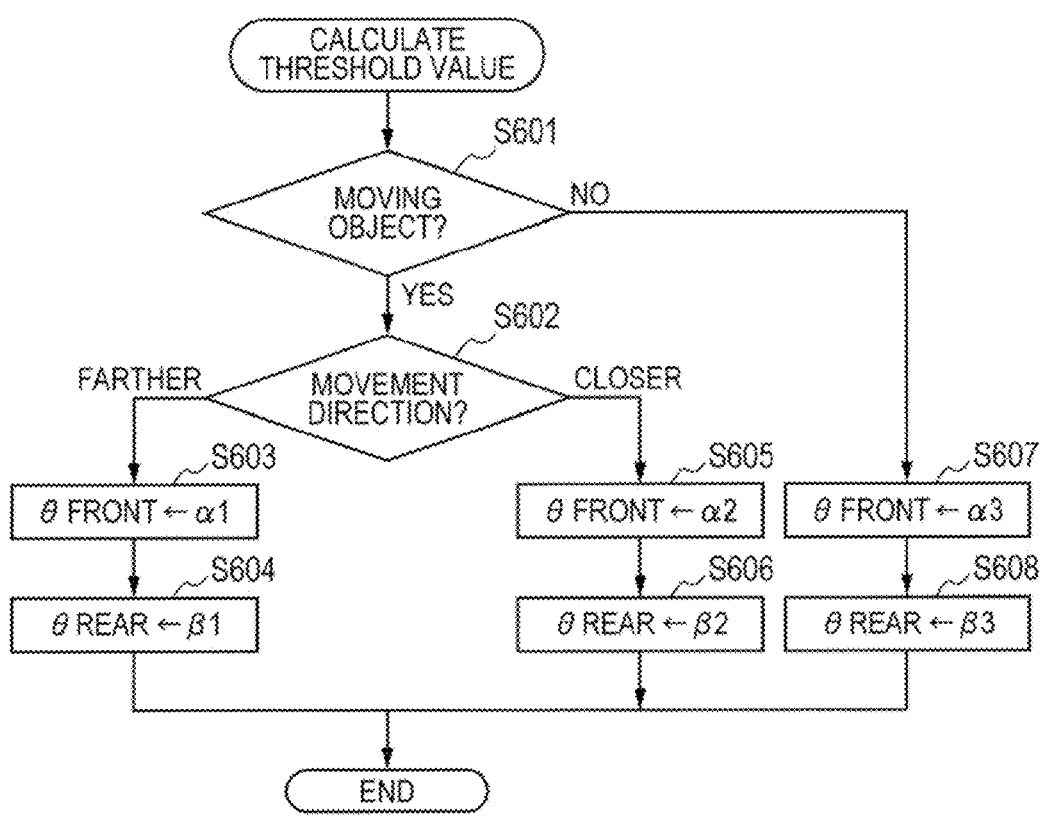
FIG. 6 is a threshold calculation flow chart of the second embodiment.

A flow chart of the second embodiment illustrated in FIG. 5 and a threshold calculation flow chart illustrated in FIG. 6 will be used to describe the configuration in detail.

FIG. 5 illustrates a flow chart of the second embodiment.

In step S501, Expression (1) is used to derive the object speed in the optical axis direction based on the time required for the detection of the focus by the signal generator 114, the focus lens target position, and the previous or past focus lens target position stored in a target position storage unit not illustrated.

$$V = (fctr1 - fctr10)/T \quad (1)$$

Here, V denotes the object speed (direction of movement to the farther side is positive), fctr1 denotes the focus lens target position, and fctr10 denotes the previous or past focus lens target position. Furthermore, T denotes time from the derivation of the focus lens target position fctr1 to the derivation of the previous or past focus lens target position fctr10. Therefore, the object speed V in the optical axis direction is derived based on a history of the focus lens target position and a history of the time of the derivation of the focus lens target position.

In step S502, thresholds are derived based on the object speed derived in step S501.

FIG. 6 specifically illustrates the threshold deriving process of step S502.

In step S601, whether the object is a moving object or a static object is decided based on the object speed V derived in step S501. For example, it is decided that the object is a moving object if the absolute value of the object speed V is higher than 5 km/h. If the object is a moving object, the process proceeds to step S602. On the other hand, if the object is a static object, the process proceeds to step S607.

In step S602, the movement direction of the object is decided. For example, the movement direction is decided by a sign of the object movement speed V. If the abject movement speed V is positive, it is decided that the object is moving farther (direction away from the lens apparatus), and the process proceeds to step S603. On the other hand, if the object movement speed V is negative, it is decided that the object is moving closer (direction approaching the lens apparatus), and the process proceeds to step S605.

In step S603, an arbitrary value α1 is assigned to a variable θfront.

In step S604, an arbitrary value β1 is assigned to a variable θrear, wherein α1≤β1.

In step S605, an arbitrary value α2 is assigned to the variable θfront.

In step S606, an arbitrary value β2 is assigned to the variable θrear, wherein α2≥β2.

In step S607, an arbitrary value α3 is assigned to the variable θfront.

In step S608, an arbitrary value β3 is assigned to the variable θrear.

The variable θfront denotes a threshold on the closer side (closer to the lens apparatus) of the focal position, and the variable θrear denotes a threshold on the farther side of the focal position.

In step S219, the variable θfront and the variable θrear calculated in step S502 are set as thresholds.

The thresholds are changed according to the state of the object in the series of flow. For example, when the object is moving and approaching the lens apparatus, the value of θfront can be wider than the value of θrear to reduce the possibility that the focal position moves to the background. Since the threshold of the movement direction of the object is wide, the tracking performance can be improved. This can prevent, the main object, from becoming out of the threshold. If the object is static, θfront and θrear can be set to the same value to allow handling a case in which the object moves to the farther side and a case in which the object moves to the closer side in the future. Furthermore, θfront and θrear can foe set to smaller values to reduce the movement of the focal position.

Although it is decided in step S601 that the object is a moving object if the absolute value of the object movement speed V is higher than 5 km/h according to the standard of deciding whether the object is a moving object or a static object, the standard is not limited to higher than 5 km/h. For example, the advantageous effects of the present invention can also be attained by deciding that the object is a moving object if the absolute value is greater than 0 km/h.

Although α1, α2, α3, β1, β2 and β3 are arbitrary values in the present embodiment, the advantageous effects of the present invention can be further attained by changing the values according to the movement speed of the object. Specifically, the value of β1 is increased when the object is moving to the farther side at a high speed. The advantageous effects of the present invention can also be attained by changing the values of α1, α2, α3, β1, β2 and β3 according to the object distance. The advantageous effects of the present invention can also be attained by changing the values of α1, α2, α3, β1, β2 and β3 according to the zoom lens position.

Although the direction of movement to the farther side is positive in the present embodiment, the advantageous effects of the present invention can also be attained even if the direction of movement to the closer side is positive.

The same applies to the following embodiments.

Third Embodiment

An AF controller according to a third embodiment will be described.

The most characteristic part of the AF controller of the present embodiment compared to the first and second embodiments is that priorities for deriving the defocus amount are set for the sensor areas. The defocus amount is preferentially derived for a sensor area with a high priority. When the charge accumulation of a sensor area with the priority higher than a predetermined value is completed, the charge accumulation of the other sensor areas is forcibly terminated. For example, there can be a case in which the charge accumulation of three sensor areas is completed at the same time when the lens controller 115 accesses the signal generator 114 to acquire a pair of image signals from a sensor area in which the charge accumulation is completed. In this case, if the detection results of the three sensor areas can be calculated in parallel at the same time, the calculation can be quickly performed without considering the processing order of the sensor areas. However, the parallel calculation may not be possible depending on the calculation apparatus, and the calculation needs to be sequentially performed for each sensor area. In this case, if the detection results of the three sensor areas are sequentially calculated one by one, the time required is three times that of the simple parallel calculation. Therefore, the calculation is performed from a sensor area in which the detection result is likely to be adopted (high priority is set) among the three sensors, and the calculation is not performed for the remaining sensor areas if a calculation result that can be adopted as a defocus value for driving the focus lens is obtained. More specifically, in the present embodiment, priorities are set for the sensor areas based on the sensor areas from which the focus values for driving the focus lens are acquired in the previous or past AF calculation cycles, and the calculation of the sensor areas is carried out based on the priorities. When the charge accumulation of a sensor area with a high priority set is completed, it can be assumed that the defocus amount for the main object is detected. Therefore, the charge accumulation of the other sensor areas is forcibly terminated. This can further increase the processing speed of AF. As a result, the tracking performance of AF can be improved.

In the following description, only main parts of the present invention will be illustrated to facilitate understanding of the present invention, and parts that are not features of the present invention will not be illustrated.

Figure 7:
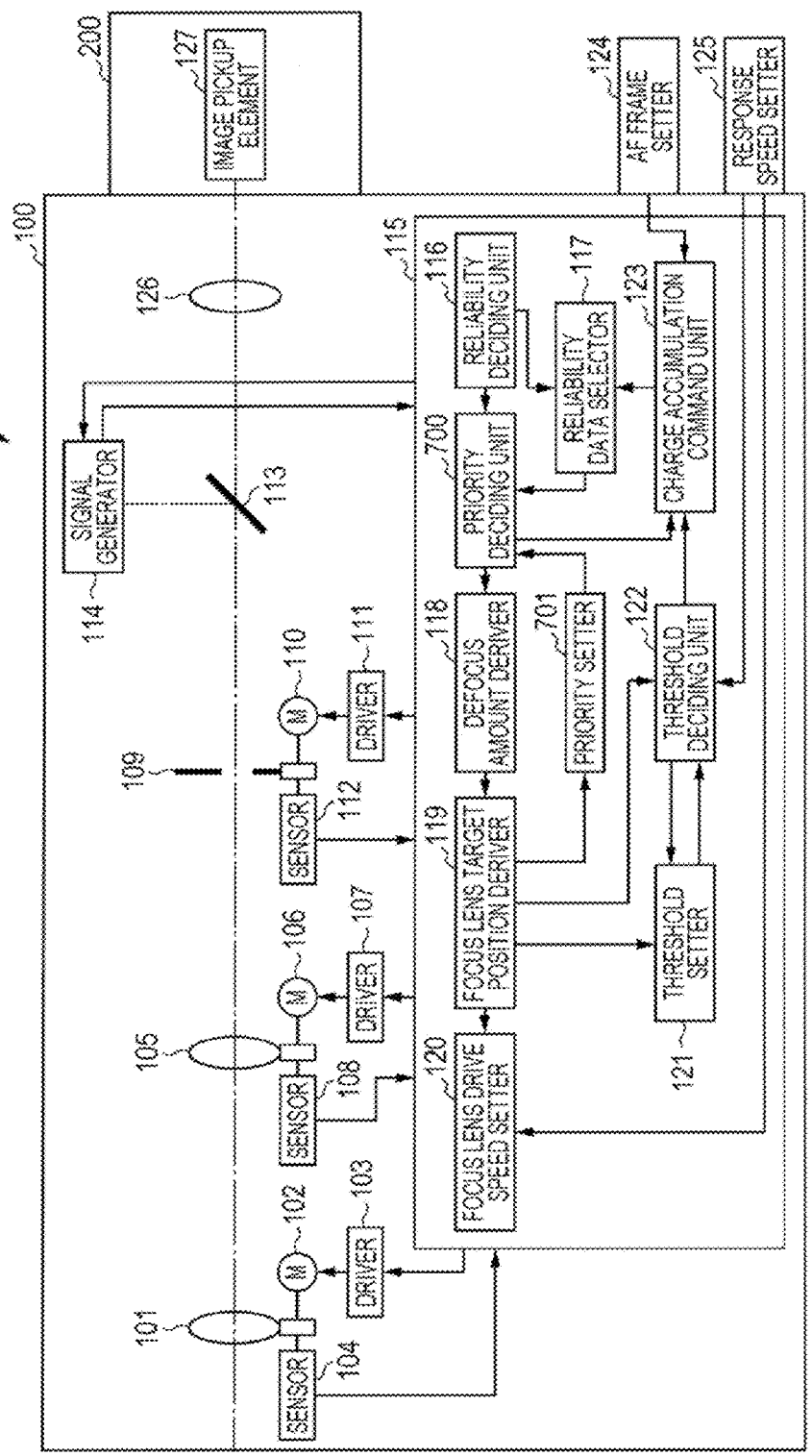
FIG. 7 is a block diagram of a third embodiment.

FIG. 7 illustrates a configuration of the AF controller according to the present embodiment. The same configurations as the first embodiment illustrated in FIG. 1 and the second embodiment illustrated in FIG. 4 will not be described, and parts different from the first and second embodiments will be described.

A priority deciding unit 700 decides the priority of each sensor area of the signal generator 114.

A priority setter 701 sets the priority of each sensor area of the signal generator 114.

Figure 8:
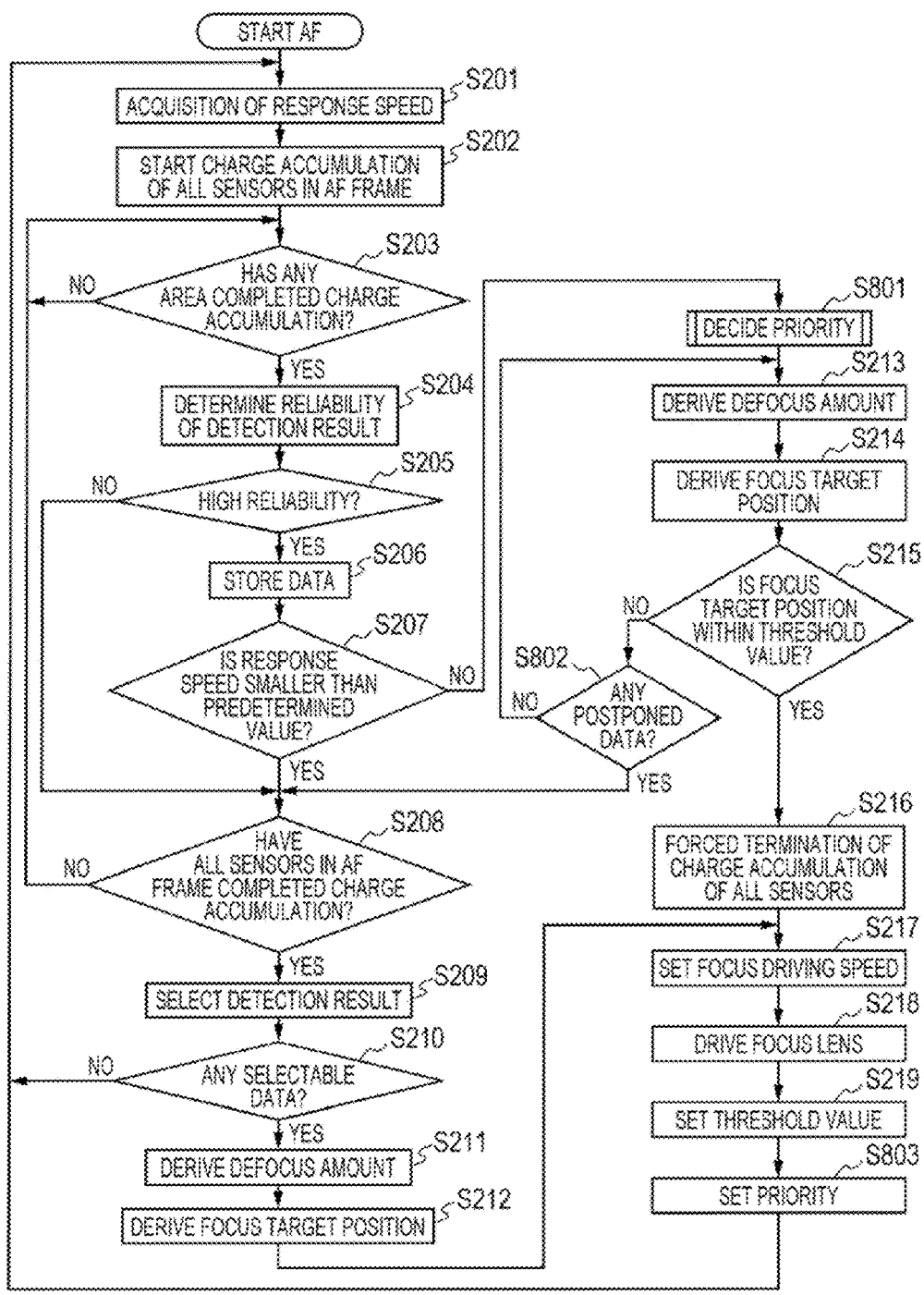
FIG. 8 is a flow chart of the third embodiment.
Figure 9:
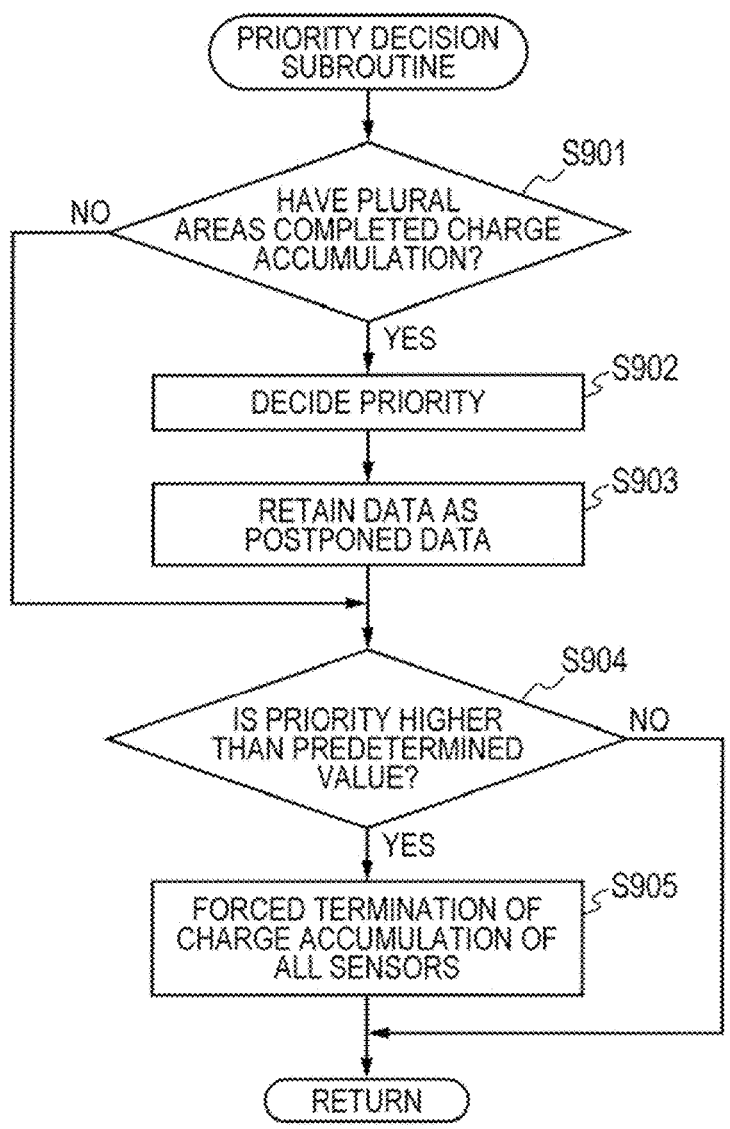
FIG. 9 is a priority decision flow chart of the third embodiment.
Figure 10:
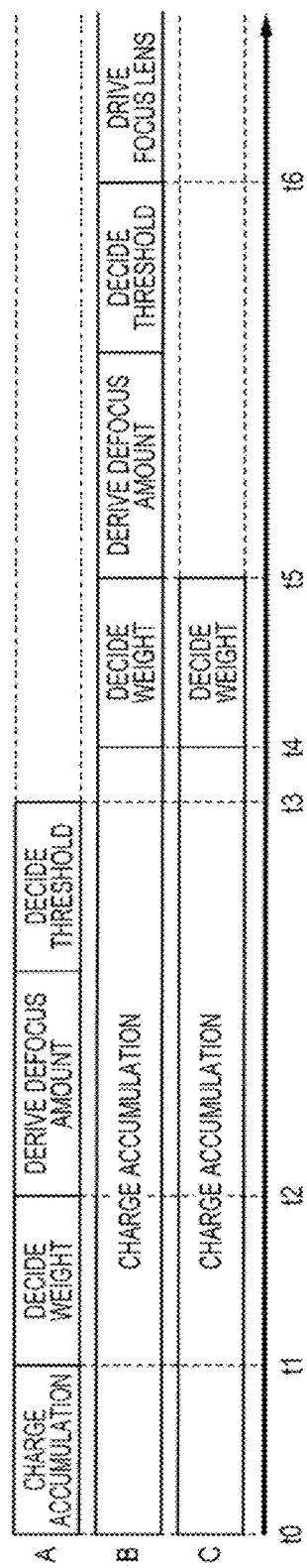
FIG. 10 is a timing chart of the third embodiment.

A flow chart of the third embodiment illustrated in FIG. 8, a priority decision flow chart illustrated in FIG. 9, and a timing chart of the third embodiment of FIG. 10 will be used to describe the configuration in detail.

FIG. 8 illustrates a flow chart of the third embodiment.

In step S207, whether the response speed acquired in step S201 is smaller than a predetermined value is decided. If the response speed is smaller than the predetermined value (if AF decision does not have to be carried out at a high speed), the process proceeds to step S208. On the other hand, if the response speed is higher than the predetermined value (if AF decision is to be carried out at a high speed), the process proceeds to step S801.

In step S801, the priority of the sensor area, in which the pair of image signals with the reliability decided to be high in step S205 are detected, is decided.

In step S215, whether the focus lens target position derived in step S214 is within the threshold set by the threshold setter 121 is decided. If the focus lens target position is within the threshold, the process proceeds to step S216. If the focus lens target position is out of the threshold, the process proceeds to step S802.

In step S802, whether there is a detection result held as postponed data among a plurality of detection results of step S801 is decided. If there is postponed data, the process returns to step S213. If there is no postponed data, the process proceeds to step S208. The postponed data will be described later.

In the present embodiment, the focus lens is driven in step S218, and the threshold is set in step S219. The process then proceeds to step S803 to set the priority of each sensor area in the AF frame. In an example of a method of setting the priority, a high priority is set for a sensor area in which the pair of image signals used to derive the focus lens target position adopted as the driving target position of the focus lens is detected. After the process of step S803, the process returns to step S201, and the series of processes are repeated.

FIG. 9 illustrates a flow chart of the priority decision of step S801.

In step S901, whether there is a plurality of sensor areas in which it is decided that the charge accumulation is completed in step S202 is decided. If there is a plurality of sensor areas in which the charge accumulation is completed, the process proceeds to step S902. On the other hand, if there is one sensor area in which the charge accumulation is completed, the process proceeds to step S904.

In step S902, the priorities of the plurality of sensor areas in which the charge accumulation is completed are compared, and the order of calculation of the detection results of the sensor areas is determined.

In step S903, as a result of comparing the priorities in step S902, the detection results other than the detection result to be calculated first are set as postponed data and retained according to the priorities.

In step S904, based on the detection result decided to be calculated first in step S902, or if it is decided that there is one detection result in step S901, whether the priority of the detection result is higher than a predetermined value is decided. If the priority is higher than the predetermined value, the process proceeds to step S905. On the other hand, if the priority is below the predetermined value, the priority decision process is terminated.

In step S905, since it is decided that the priority is higher than the predetermined value in step S904, the charge accumulation of all sensors in the AF frame is forcibly terminated.

The priorities of the sensor areas in which the charge accumulation is completed are decided in the described series of flow, and sensor areas with high priorities are preferentially calculated.

Figures 15A, 15B:
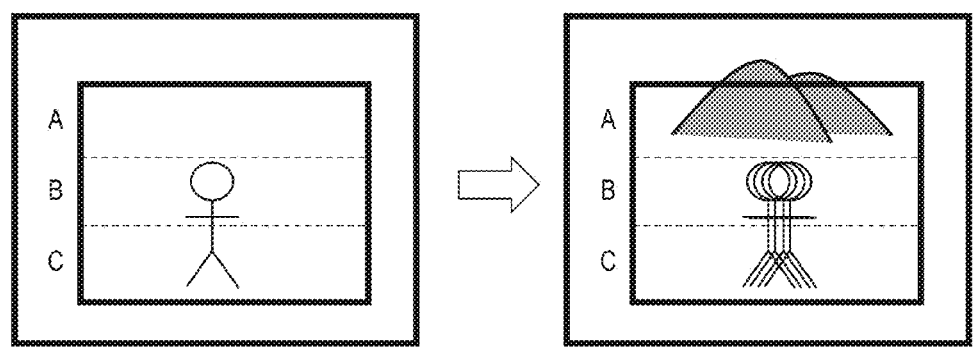
FIG. 15A illustrates a photographed image and sensor areas of a conventional example (compositions 1 and 2).
FIG. 15B is a timing chart of the conventional example.

FIG. 10 illustrates a timing chart applying the present embodiment when the composition is changed from FIG. 15A (composition 1) to FIG. 3A, as in FIG. 3B. In the description of the present embodiment, the defection result of the sensor area B is adopted in the composition of FIG. 15A (composition 1) before time t0 described below, and a high priority is set for the sensor area B.

At the time t0, the charge accumulation of the sensor areas A, B and C in the AF frame is started. At time t1, since the charge accumulation of the sensor area A is completed when the lens controller 115 acquires the charge accumulation completion data of the signal generator 114, the priority deciding unit 700 performs the priority decision from the time t1. As a result, at the time t1, the charge accumulation is completed only in the sensor area A, and a high priority is not set for the sensor area A. Therefore, the charge accumulation or the sensor areas B and C is not terminated, and the defocus amount is derived for the detection result of the sensor area A from time t2 to derive the focus target position. At time t3, since the decision result indicating whether the derived focus target position is within the threshold is not within the threshold, the charge accumulation of the sensor areas B and C is continued without the forced termination.

At time t4, the charge accumulation of the sensor areas B and C is completed when the lens controller 115 acquires the charge accumulation completion data of the signal generator 114. Since there is a plurality of sensor areas in which the charge accumulation is completed, the priority decision process of step S801 is executed to compare the priorities of the sensor areas B and C. A high priority is set for the sensor area B in the composition of FIG. 15A (composition 1), and it is decided that the sensor area B is to be calculated first. The sensor area C is retained as postponed data. Since the priority of the sensor area B is higher than the predetermined value, the charge accumulation of the other sensor areas is forcibly terminated. From time t5, the defocus amount is derived for the detection result of the sensor area B to derive the focus target position, and whether the derived focus target position is within the threshold is decided. As a result, the derived defocus target position is within the threshold, and from time t6, the focus lens is driven toward the focus lens target position derived from, the detection result of the sensor area B. Therefore, when the charge accumulation of a plurality of sensor areas is completed at the same time, the order of calculation is determined by the priorities, and the processing time before driving the focus lens can be shorter than when the calculation is sequentially performed one by one. If the priority of the sensor area A is higher than the predetermined value, the charge accumulation of the other sensor areas is forcibly terminated at the time t2. Therefore, the processing time can be further reduced, and the tracking performance can be improved.

In the present embodiment, although a high priority is set for a sensor area in which a pair of image signals are detected that are used to derive the adopted focus lens target position, the advantageous effects of the present invention can also be attained by arranging a lens apparatus or an external input unit (priority changer), and allowing the user to set the priorities of the sensor areas.

Although the present embodiment includes the priority deciding unit 700 and the priority setter 701 in addition to the configuration of the first embodiment, the advantageous effects of the present invention can also be attained by adding the components to the configuration of the second embodiment.

The same applies to the following embodiments.

Fourth Embodiment

An AF controller according to a fourth embodiment will be described.

Figure 11A:
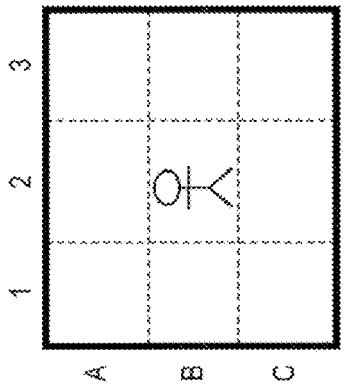
FIG. 11A illustrates an object and sensor areas of a fourth embodiment (composition 1).
Figure 11B:
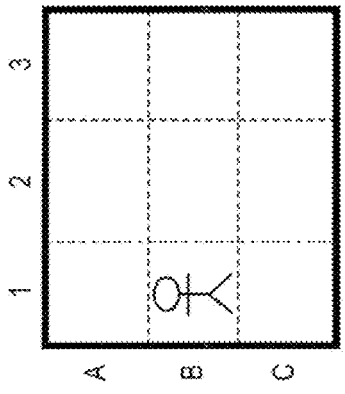
FIG. 11B illustrates an object and sensor areas of a fourth embodiment (composition 2).

The most characteristic part of the AF controller of the present embodiment compared to the first, second and third embodiments is that a sensor area with a high possibility of detecting the main object next time is predicted according to a trajectory (history) of sensor areas that have detected the main object, and a high priority is set for the predicted sensor area. FIG. 11A illustrates a main object and sensor areas, and FIG. 11B illustrates a next composition after a predetermined time from FIG. 11A. In FIG. 11A, an AF frame includes nine sensor areas, and a sensor area B1 has detected the main object. FIG. 11B illustrates a composition when the object is moved, or panning of the lens apparatus is performed from the composition of FIG. 11A. In FIG. 11B, it can be recognized that a sensor area B2 detects the main object. More specifically, from the composition of FIG. 11A to the composition of FIG. 11B, the sensor area detecting the object has changed from B1 to B2. Therefore, it can be predicted that a sensor area B3 will likely detect the main object in the detection of the next time after a predetermined time. As a result, a high priority is set for the sensor area B3.

In the following description, only main parts of the present invention will be illustrated to facilitate understanding of the present invention, and parts that are not features of the present invention will not be illustrated.

Figure 12:
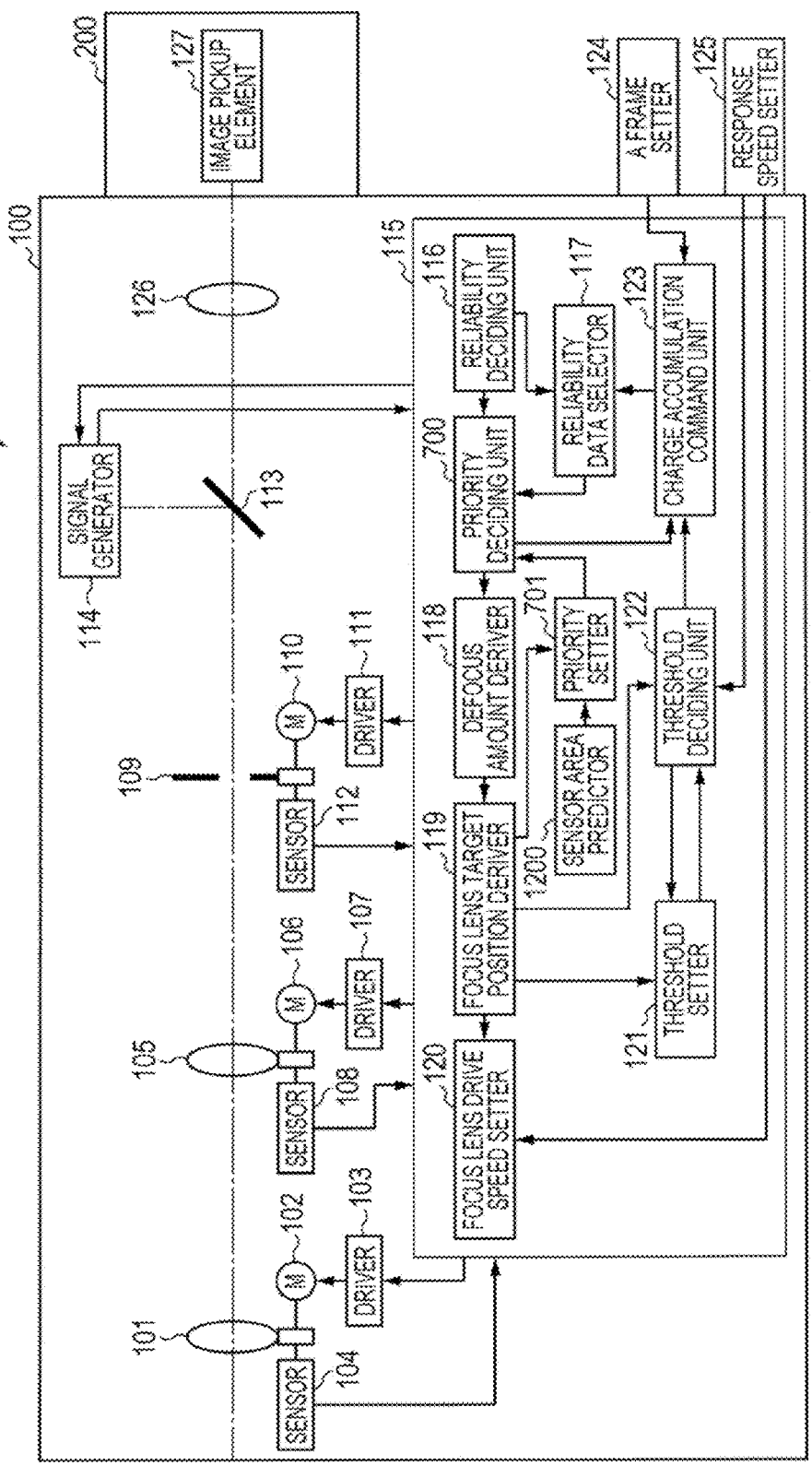
FIG. 12 is a block diagram of the fourth embodiment.

FIG. 12 illustrates a configuration of the AF controller according to the present embodiment. The same configurations as the first embodiment illustrated in FIG. 1, the second embodiment illustrated in FIG. 4 and the third embodiment illustrated in FIG. 7 will not be described, and parts different from the first, second and third embodiments will be described.

A sensor area predictor 1200 (prediction unit) stores a trajectory (history) of the sensor areas that have detected the main body and predicts a sensor area with a high possibility of detecting the main object next time based on the stored trajectory (history).

Figure 13:
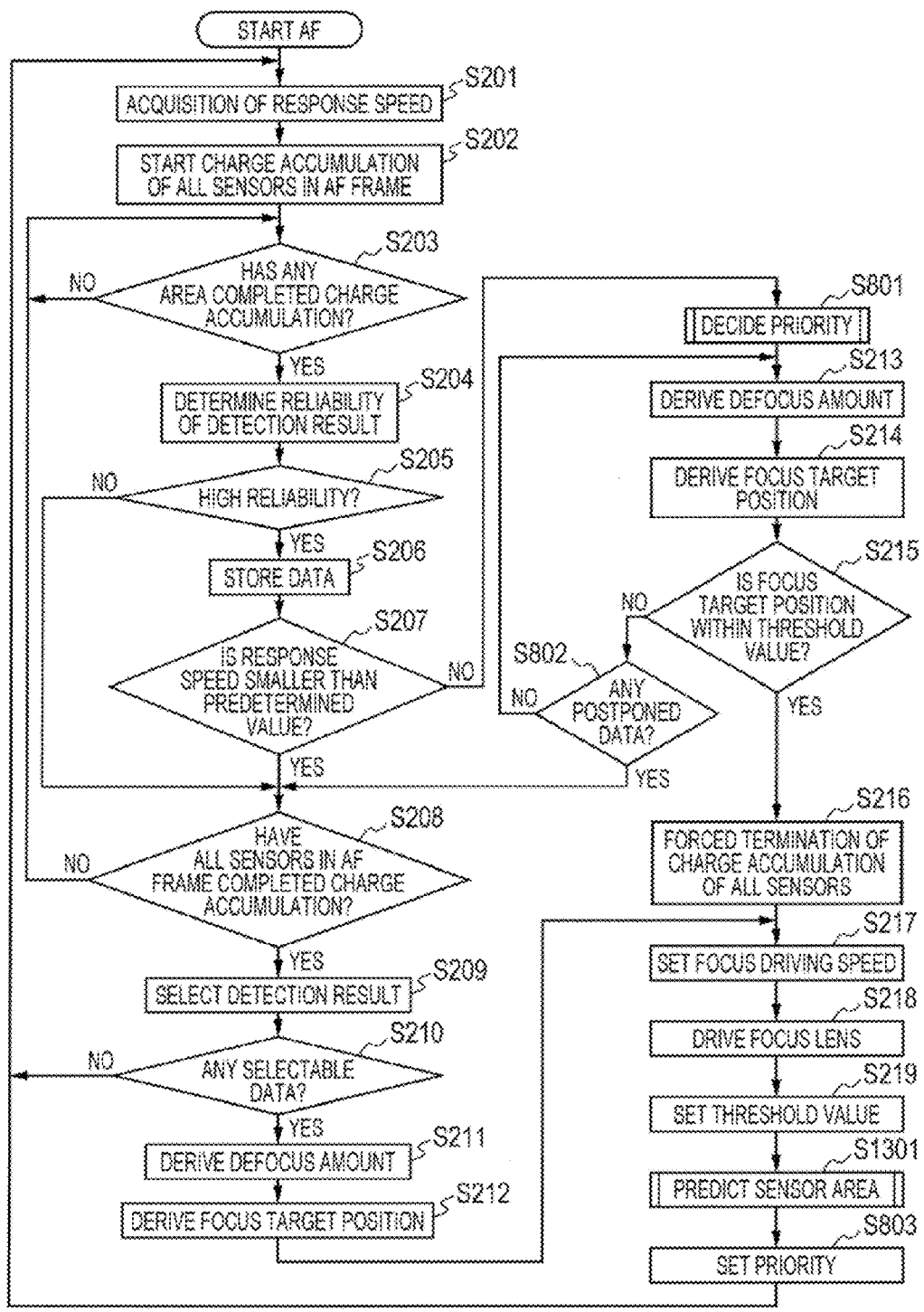
FIG. 13 is a flow chart of the fourth embodiment.
Figure 14:
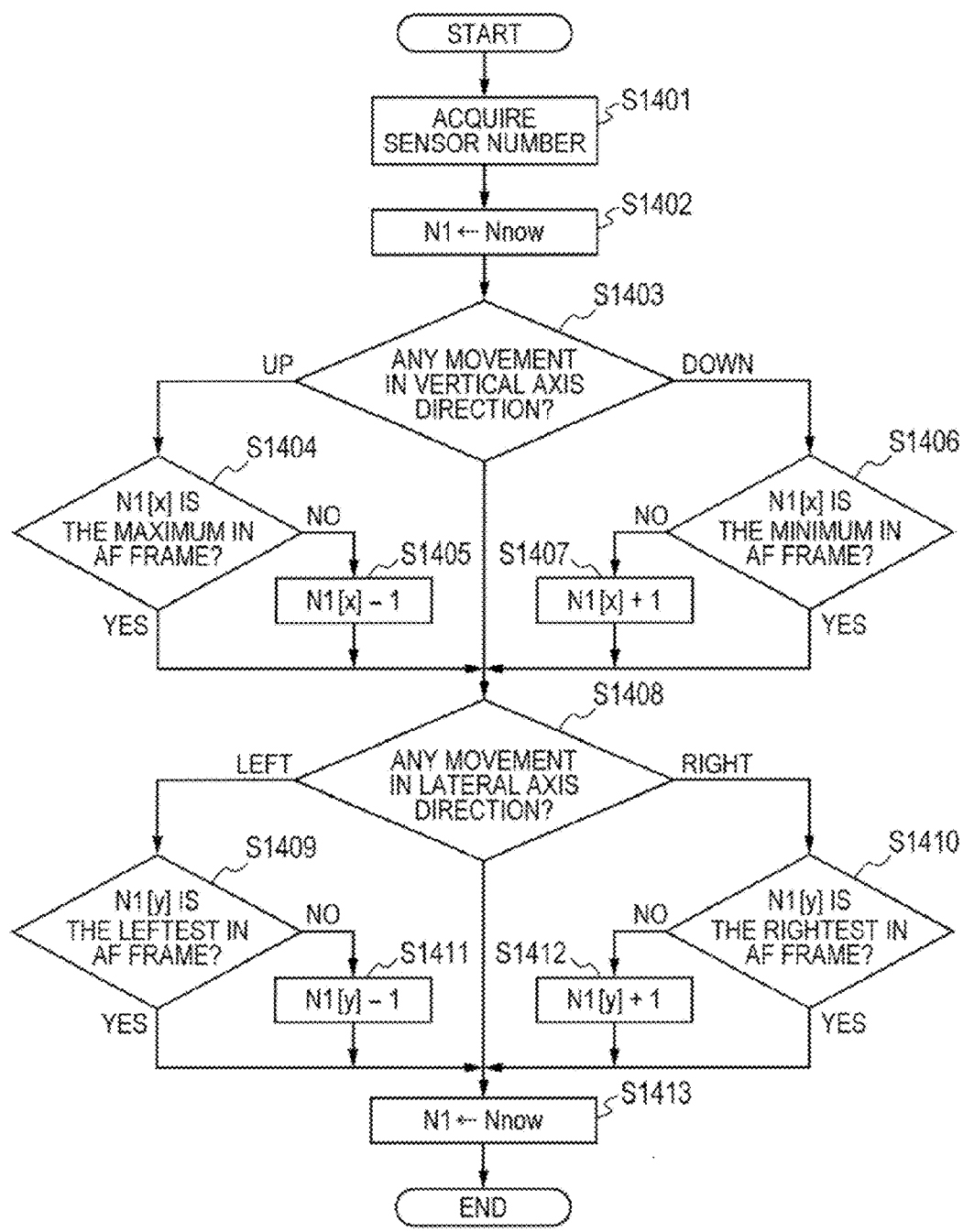
FIG. 14 is a sensor area prediction flow chart of the fourth embodiment.

A flow chart of the fourth embodiment illustrated in FIG. 13 and a sensor area prediction flow chart of the fourth embodiment illustrated in FIG. 14 will be used to describe the configuration in detail. In the present embodiment, the description is based on the sensor areas in the AF frame illustrated in FIGS. 11A and 11B.

FIG. 13 illustrates a flow chart of the fourth embodiment.

In the present embodiment, the focus lens is driven in step S218, and the threshold is set in step S219. The process then proceeds to step S1301 to predict a sensor area with a high possibility of detecting the main object next time from the trajectory of the sensor areas that have detected the main object. The process proceeds to step S803.

In step S803, a high priority is set for the sensor area in which it is predicted that the possibility of detecting the main object next time is high in step S1301.

FIG. 14 illustrates a flow chart of the sensor area prediction of step S1301.

In step S1401, a number for identifying the sensor area adopted when the focus lens is driven in step S218 is acquired, and the number is stored as a variable Nnow. In the case of FIG. 11B, numbers are expressed by the vertical axis and the lateral axis, such as A1, and B2 is stored as the variable Nnow.

In step S1402, the variable Nnow is assigned to the variable N1.

In step S1403, the variable N0 storing the number for identifying the sensor area adopted last time and the variable Nnow are compared to decide whether the sensor number has moved in the vertical direction in the sensor areas in the AF frame. If the sensor number has moved upward, the process proceeds to step S1404. If the sensor number has moved downward, the process proceeds to step S1406. On the other hand, if the sensor number has not moved in the vertical direction, the process proceeds to step S1408. In the case of FIGS. 11A and 11B, the number for identifying the adopted sensor area is moved from the sensor number B1 to the sensor number B2. Therefore, it is decided that there is no movement in the vertical direction, and the process proceeds to step S1408.

In step S1404, whether the number for identifying the vertical direction of the variable N1 is the maximum in the AF frame is decided. If the number is the maximum, the process proceeds to step S1408. On the other hand, if the number is not the maximum, the process proceeds to step S1405. In the case of FIGS. 11A and 11B, the maximum in the vertical direction of the sensor areas is A.

In step S1405, the number in the vertical direction of the variable N1 is decremented. In the case of FIGS. 11A and 11B, the numbers in the vertical direction are indicated by A, B and C. Therefore, B becomes A when B is decremented, and B becomes C when B is incremented.

In step S1406, whether the number for identifying the vertical direction of the variable N1 is the minimum in the AF frame is decided. If the number is the minimum, the process proceeds to step S1408. On the other hand, if the number is not the minimum, the process proceeds to step S1407. In the case of FIGS. 11A and 11B, the minimum in the vertical direction of the sensor areas is C.

In step S1407, the number in the vertical direction of the variable N1 is incremented.

In step S1408, the variable N0 storing the number for identifying the sensor area adopted last time and the variable Nnow are compared to decide whether the sensor number has moved in the lateral direction in the sensor areas in the AF frame. If the sensor number has moved in the left direction, the process proceeds to step S1409. If the sensor number has moved in the right direction, the process proceeds to step S1410. On the other hand, if the sensor number has not moved in the lateral direction, the process proceeds to step S1413. In the case of FIGS. 11A and 11B, the number for identifying the adopted sensor area has moved from the sensor number B1 to the sensor number B2. Therefore, it is decided that the movement in the lateral direction is to the right, and the process proceeds to step S1410.

In step S1409, whether the number for identifying the lateral direction of the variable N1 is the leftmost in the AF frame is decided. If the number is the leftmost, the process proceeds to step S1413. On the other hand, if the number is not the leftmost, the process proceeds to step S1411. In the case of FIGS. 11A and 11B, the leftmost in the lateral direction of the sensor area is 1.

In step S1411, the number in the lateral direction of the variable N1 is decremented.

In step S1410, whether the number for identifying the lateral direction of the variable N1 is the rightmost in the AF frame is decided. If the number is the rightmost, the process proceeds to step S1413. On the other hand, if the number is not the rightmost, the process proceeds to step S1412. In the case of FIGS. 11A and 11B, the rightmost in the lateral direction of the sensor area is 3, and N1 is B2. Therefore, the process proceeds to step S1412.

In step S1412, the number in the lateral direction of the variable N1 is incremented.

In step S1413, the variable Nnow storing the number for identifying the sensor area number adopted this time is assigned to the variable N0 storing the number for identifying the sensor area adopted last time.

A high priority is set for the sensor area identified by the variable N1 predicted in the described sensor area prediction flow chart.

The sensor area with a high possibility of detecting the main object next time is predicted based on the trajectory of the sensor areas adopted in the series of flow, and a high priority is set for the predicted sensor area. Therefore, the sensor area with a high possibility of detecting the main object next time is preferentially calculated. This can speed up the calculation process and improve the tracking performance.

Although a high priority is set for the predicted sensor area in the present embodiment, the advantageous effects of the present invention can also be attained by setting high priorities to both of the predicted sensor area and the sensor area adopted last time.

Although the sensor area is predicted based on the sensor areas adopted last time and this time in the present embodiment, the advantageous effects of the present invention can also be attained by predicting the sensor area based on the sensor area adopted in the previous or past time and the sensor area adopted this time. Although the prediction is based on two sensor areas adopted last time and this time, the advantageous effects of the present invention can also be attained even if more than two sensor areas are used for the prediction process.

Although the vertical and lateral directions are used for the number for identifying the sensor area in the present embodiment, the method is not limited to this as long as the sensor area can be identified, and the arrangement relationship between the sensor areas can be recognized. For example, serial numbers can be set for the numbers for identifying the sensor areas regardless of the vertical and lateral directions, and the arrangement relationship between the numbers can foe recognized by a table. The advantageous effects of the present invention can also be attained by this method.

Although the sensor area with a high possibility of defecting the main object next time is predicted by incrementing or decrementing the number for identifying the sensor area adopted this time by one, the advantageous effects of the present invention can also be attained by incrementing or decrementing the number by two or more. For example, if the number in the lateral direction of the sensor area adopted this time is increased by three from the number in the lateral direction of the sensor area adopted last time, the number in the lateral direction of the predicted sensor area is a value obtained by adding three to the number in the lateral direction of the sensor area adopted this time.

Although the AF controller of the present invention is included in the lens apparatus in the illustrated description of the embodiments, the present invention is not limited to this configuration. For example, the AF controller may be included in a camera apparatus including an image pickup element, wherein the lens apparatus can be attached and detached. The advantageous effects of the present invention can also be attained even if the AF controller is included in an image pickup apparatus with a combination of a camera apparatus, which includes an image pickup element, and a lens apparatus. When the AF controller is included in a camera apparatus, an image signal pair may be input from a signal generator including a phase difference detection sensor outside of the camera apparatus for each of a plurality of areas dividing an image pickup surface, or a phase difference sensor incorporated into an image pickup element including a CMOS in the camera apparatus may form a signal generator that acquires an image signal pair of each of a plurality of areas dividing the image pickup surface.

Although the exemplary embodiments of the present invention have been described, the present invention is not limited to the embodiments, and various modifications and changes can be made within the scope of the present invention.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-150259, filed Jul. 19, 2013, which is hereby incorporated by reference herein in its entirety.

What is claimed is:

1. An AF controller comprising:
a signal generator configured to perform a charge accumulation by a plurality of sensors provided in each of a plurality of areas in an imaging angle of view to generate an image signal pair;
a driving command outputter configured to output a driving command to a focus lens based on one of the plurality of image signal pairs; and
an accumulation controller configured to control the charge accumulation of the plurality of sensors provided in each of the plurality of areas,
wherein when a position of the focus lens based on the image signal pair corresponding to an area among the plurality of areas is within an acceptable range, the driving command outputter outputs the driving command for the focus lens, and the accumulation controller outputs to the signal generator a command to complete the charge accumulation of the plurality of sensors provided in the other areas.

2. The AF controller according to claim 1, further comprising a target position deriver configured to derive a driving target position of the focus lens based on an image signal pair corresponding to an area among the plurality of areas,
wherein the driving command outputter outputs a driving command to the focus lens based on the driving target position.

3. The AF controller according to claim 1, wherein the acceptable range is set by one of the defocus amount, an object distance, the position of the focus lens, and a difference between peak positions of the image signal pair.

4. The AF controller according to claim 1, further comprising an acceptable range changer configured to change the acceptable range to an arbitrary value.

5. The AF controller according to claim 2, further comprising a reliability data selector configured to decide reliability of the image signal pair from the signal generator based on a correlation of the image signal pair and to select one of the image signal pairs with high reliability,
wherein the target position deriver derives the driving target position of the focus lens based on the defocus amount on the basis of the image signal pair selected by the reliability data selector and based on the position of the focus lens.

6. The AF controller according to claim 2, further comprising an object speed calculator configured to calculate an object speed in an optical axis direction based on a history of the driving target position and a history of time of the derivation of the driving target position.

7. The AF controller according to claim 6, further comprising a threshold setter configured to set the threshold based on at least one of a movement speed and a movement direction of an object.

8. The AF controller according to claim 2, further comprising a priority setter configured to set priorities for the areas,
wherein the target position deriver preferentially derives the defocus amount of the image signal pair of an area with a high priority set by the priority setter and derives the driving target position of the focus lens based on the defocus amount and the position of the focus lens.

9. The AF controller according to claim 8, wherein the priority setter sets a high priority for the area used to derive the driving target position.

10. The AF controller according to claim 8, further comprising a priority changer configured to change the priority to an arbitrary value.

11. The AF controller according to claim 8, further comprising a prediction unit configured to predict an area with a high possibility of detecting a main object next time based on a relationship between the area used to derive the driving target position last time and the area used to derive the driving target position this time,
wherein the priority setter sets a high priority for the area predicted by the prediction unit.

12. The AF controller according to claim 8, wherein if the priority of the area in which the charge accumulation is completed is higher than a predetermined value, the accumulation controller commands all of the areas of the signal generator to terminate the charge accumulation.

13. The AF controller according to claim 1, further comprising an AF frame setter configured to set an AF frame for setting areas for AF adjustment in the imaging angle of view.

14. The AF controller according to claim 1, further comprising a response speed setter configured to set a response speed of AF control,
wherein if the response speed is slower than a predetermined speed, the driving target position of the focus lens is derived after the charge accumulation of all areas subject to the AF adjustment by the signal generator is completed.

15. A lens apparatus comprising:
a focus lens;
a focus lens driver configured to drive the focus lens;
a position detector configured to detect a position of the focus lens;
a signal generator configured to acquire an image signal pair by a phase difference sensor for each of a plurality of areas dividing an imaging angle of view; and
an AF controller comprising:
a signal generator configured to perform a charge accumulation by a plurality of sensors provided in each of a plurality of areas in an imaging angle of view to generate an image signal pair;
a driving command outputter configured to output a driving command to a focus lens based on one of the plurality of image signal pairs; and
an accumulation controller configured to control the charge accumulation of the plurality of sensors provided in each of the plurality of areas,
wherein when a position of the focus lens based on the image signal pair corresponding to an area among the plurality of areas is within an acceptable range, the driving command outputter outputs the driving command for the focus lens, and the accumulation controller outputs to the signal generator a command to complete the charge accumulation of the plurality of sensors provided in the other areas.

16. An image pickup apparatus comprising:
a lens apparatus, comprising:
a focus lens;
a focus lens driver configured to drive the focus lens;
a position detector configured to detect a position of the focus lens;
a signal generator configured to acquire an image signal pair by a phase difference sensor for each of a plurality of areas dividing an imaging angle of view; and
an AF controller comprising:
a signal generator configured to perform a charge accumulation by a plurality of sensors provided in each of a plurality of areas in an imaging angle of view to generate an image signal pair;
a driving command outputter configured to output a driving command to a focus lens based on one of the plurality of image signal pairs; and
an accumulation controller configured to control the charge accumulation of the plurality of sensors provided in each of the plurality of areas,
wherein when a position of the focus lens based on the image signal pair corresponding to an area among the plurality of areas is within an acceptable range, the driving command outputter outputs the driving command for the focus lens, and the accumulation controller outputs to the signal generator a command to complete the charge accumulation of the plurality of sensors provided in the other areas; and
a camera apparatus including an image pickup element that receives object light from the lens apparatus,
wherein the lens apparatus and the camera apparatus are integrally configured.

17. An image pickup apparatus comprising:
a lens apparatus, comprising:
a focus lens;
a focus lens driver configured to drive the focus lens;
a position detector configured to detect a position of the focus lens;
a signal generator configured to acquire an image signal pair by a phase difference sensor for each of a plurality of areas dividing an imaging angle of view; and
an AF controller comprising:
a signal generator configured to perform a charge accumulation by a plurality of sensors provided in each of a plurality of areas in an imaging angle of view to generate an image signal pair;
a driving command outputter configured to output a driving command to a focus lens based on one of the plurality of image signal pairs; and
an accumulation controller configured to control the charge accumulation of the plurality of sensors provided in each of the plurality of areas,
wherein when a position of the focus lens based on the image signal pair corresponding to an area among the plurality of areas is within an acceptable range, the driving command outputter outputs the driving command for the focus lens, and the accumulation controller outputs to the signal generator a command to complete the charge accumulation of the plurality of sensors provided in the other areas; and
a camera apparatus including an image pickup element configured to receive object light from the lens apparatus,
wherein the lens apparatus and the camera apparatus are detachably connected to each other.

* * * * *